Jan. 11, 1938.　　　M. O. BESSONETTE　　　2,105,211
HAMBURGER PATTY FORMING APPARATUS
Filed April 6, 1936
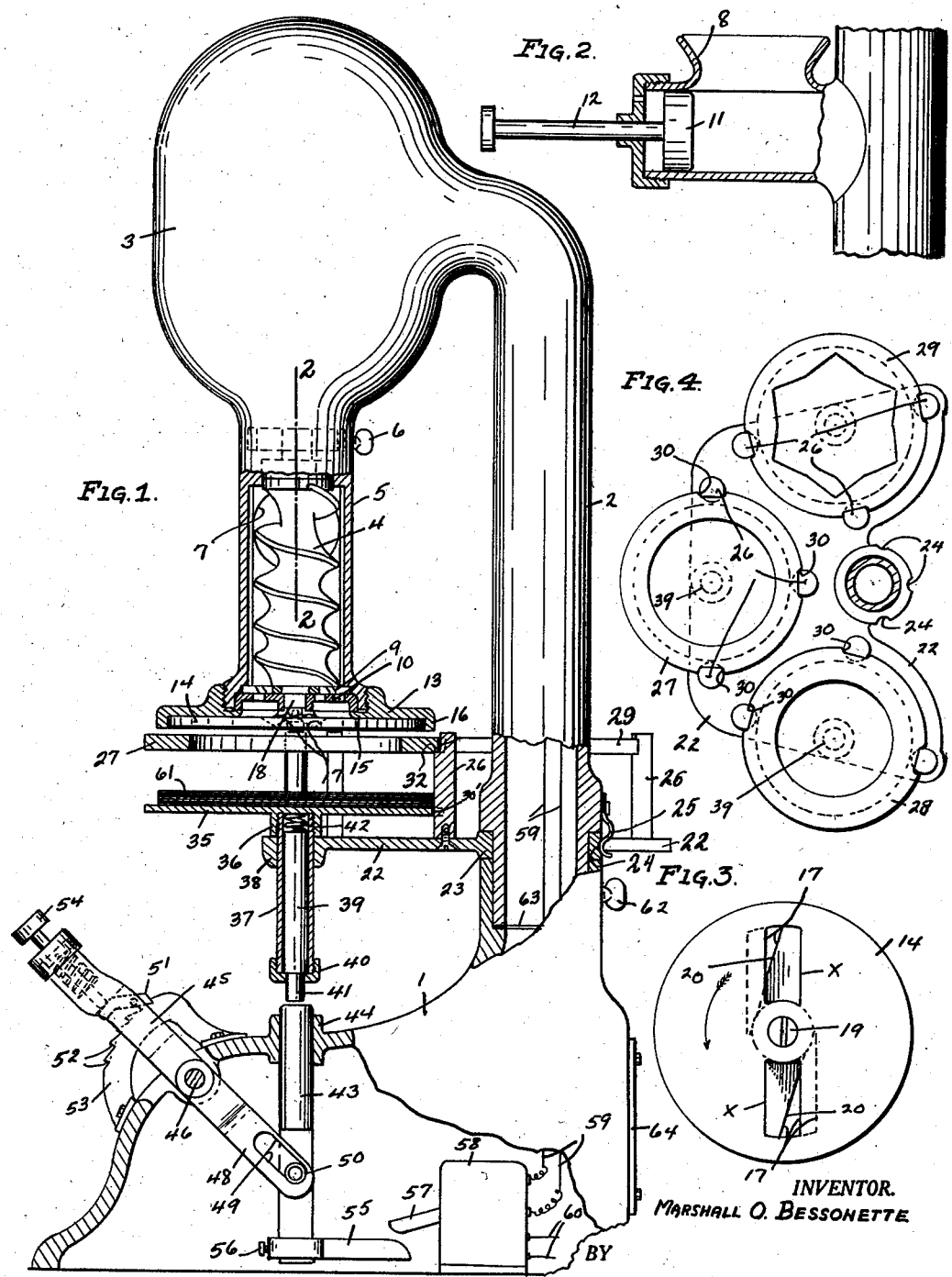
INVENTOR.
MARSHALL O. BESSONETTE
BY
Miller Boyken & Bried
ATTORNEYS Patented Jan. 11, 1938

2,105,211

UNITED STATES PATENT OFFICE 2,105,211

HAMBURGER PATTY FORMING APPARATUS

Marshall O. Bessonette, Medford, Oreg.

Application April 6, 1936, Serial No. 72,911

16 Claims. (Cl. 17—32)

This invention relates to apparatus for making hamburger steak patties and has for its objects the provision of means for quickly forming various sized hamburger steak patties of a uniform predetermined size and shape, and means for grinding the steak immediately prior to the forming of each patty, which grinding means contributes to the forming of the patties. A further object is the provision of means for quickly making patties of hamburger steak in various predetermined shapes and sizes. Other objects and advantages will appear in the following specifications and drawing.

In the drawing, Fig. 1 is a side view of my apparatus, broken away in parts and sectioned to show the construction more clearly and with the elements beyond a vertical plane at the sectioned portion being omitted for clarity.

Fig. 2 is a fragmentary view, partly in section, of a portion of my apparatus as seen along the line 2—2 of Fig. 1, showing the means for feeding meat to the grinder.

Fig. 3 is a bottom plan view of the patty smoothing and meat distributing member.

Fig. 4 is a reduced plan view of a table carrying the patty forms, including the forms, the supporting standard being in section.

In detail my apparatus comprises a hollow cast base or pedestal 1, a hollow post 2 extending vertically therefrom, supporting an electric motor 3 from one side thereof disposed with its shaft vertical and extending from the lower side of the motor. A conventional meat chopper feed screw 4 is removably connected to the motor shaft, which screw extends vertically downwardly in a tubular casing 5 secured by a thumb-screw 6 to the motor housing. At the upper end of casing 5 is a laterally directed feed inlet 7 through which chunks of meat from a hopper 8 are fed to the screw 4 for being partially chopped and fed to cutter 9 revolvable therewith and through the holes in the conventional stationary disk 10 associated therewith. The hopper is preferably fitted with a piston-like pusher member 11 adapted to be actuated to push or force the meat through the inlet 7 to the upper end of the screw 4, a push rod 12 being connected to the member 11 for manually forcing the member toward the inlet, or a link connection of conventional form can be used, such means being common in apparatus of this type and no claim being made thereto apart from the combination as shown.

At the lower end of tubular casing 5 is a relatively shallow cylindrical bell-like housing 13, open at its lower end, and threadedly engaging the lower end of the casing 5 at its neck. Revolvably fitted within this housing is a circular disk 14 of greater diameter than the casing 5.

The housing 13 is provided with a radially inwardly directed lip 15 securing the perforate member 10 against revolving in the casing 5 relative to cutter 9 and the sides 16 of the housing terminate at their lower edges slightly below the lower surface of disk 14.

The disk 14 is formed with slots 17 extending oppositely and radially outwardly of the center of the disk, and the disk is secured to stub shaft 18 axially extending downwardly from the lower end of the screw feed 5 by a screw 19 for turning of the disk with the screw feed in the direction of the arrow as indicated in Fig. 3.

Each of the slots respectively has similarly inclined beveled sides providing an acute edge 20, on the side adjacent the perforate member 10 of the chopper head and on the side of the slot facing the direction of travel of the slots, so that ground or chopped meat fed to the disk 14 will be passed through the slots in an angular direction relative to the plane of the disk as the disk revolves and over the relatively obtuse angle formed along the lines X as seen in Fig. 3. The acute edges 20 of the slots extend generally tangentially outwardly relative to the central hub 21 of the disk, and the slots terminate at their outer ends inwardly of the edge of the disk so that all the meat will pass through the slots to the lower side of the disk, and will not jam between the disk and sides of housing 13.

The inclination of the side edges of the slots, and the directional course taken by the meat, provide for a smoothing of the upper surface of the ground meat as it leaves the slots in the disk 14.

Below the housing 13 and disk 14, I provide a horizontal table 22 (Figs. 1 and 4), which table is revolvably supported at bearing 23 from the post 2 so as to swing around the post to various positions, the bearing 23 being notched at several places as at 24 to receive the end of a leaf spring 25 that is secured to post 2 for frictionally securing the table at the several positions determined by the positions of the notches, but by slight force the table may be swung from one position to the other around the post.

The table 22 carries three sets of posts 26, each set of posts comprising three, each extending vertically upwardly from the table, and the posts of each set are arranged to receive therein an annular ring, the rings being indicated at 27, 28, 29 (Fig. 4) and each ring being notched at its edge in three places as at 30 to slidably secure the ring between the posts of the set in which it is positioned for vertical movement.

Said posts are cut away at their upper ends to form shoulders 32 supporting the rings at the upper ends of the posts spaced a substantial distance from the table.

Axially aligned below the rings is a circular plate 35 centrally formed with an internally threaded downwardly projecting hub 36 that rests on the table 22, and a tubular sleeve 37 is threaded into each hub and extends downwardly therefrom. The table is journaled at its outer edge in three places and is formed with bearings 38 slidably passing the sleeves to below the table, while the edges of the plates 35 are provided with notches at 30' generally similar to the notches in rings 27 to 29 to slidably secure each plate between the posts 26 of each set of posts on the table.

Within each sleeve 37 is a rod 39 shouldered at its lower end to engage a nut 40 threaded on the lower end of the sleeve for retaining the rod within the sleeve, and the rod is reduced below the shoulder at 41 to pass through an opening formed in the nut and to extend a slight distance below the nut. Between the upper end of rod 39 and plate 35 is a small coil spring 42 that is adapted to yieldably force the rod downwardly within the sleeve, so that upon lifting the rod from its reduced lower end the plate is yieldably supported on the spring.

Within the base or pedestal 1 of the apparatus is a vertically slidable rod 43 extending through a bearing 44 in the pedestal and the rod 43 is axially aligned below rod 39. The rod 43 is adapted to be lifted vertically to engage rod 39 and to lift the plate 35 by means of lever 45 pivoted on a shaft 46, which lever is provided with arms 48 at its outer end, each of which arms is slotted at 49 to receive rollers 50 that extend from opposite sides of the post 43. The lever extends outwardly of the pedestal at the end opposite the arms 48 and is provided with a pawl 51 adapted to successively engage teeth 52 in a ratchet member 53. The pawl being releasable from engagement with the teeth by a thumb release 54 extending from the outer end of the lever.

The lower end of the rod 43 is provided with a laterally extending arm 55 adjustable on the rod by a nut 56 that is adapted to engage a switch arm 57 of an electric switch 58 having wires 59 leading to the motor 3 and also main power wires 60 for supplying current to the motor. The switch is of the conventional automatic "cut-off" type adapted to close the circuit to the motor when the switch arm 57 is lifted by the arm 55 and to automatically break the circuit when the arm 57 is released.

On each of the plates 35 is a stack of waxed papers 61, also guided between the posts 26, but not necessarily notched, like the plate.

In the foregoing description, the particular mounting of only one of the plates 35 has been described, but there are three of these plates, one for each of the three annular rings, and there is only one lifting mechanism in the pedestal. The notches 24 on the table are so arranged that the table in its several positions will support one of the plates 35, stacks of paper 61, and the annular rings thereabove directly below, and axially aligned with the housing 13 on the chopper and in such position, the post 39 extending below the plate 35 will be exactly over and aligned with the post 43 in the pedestal when that particular plate is below the chopper. It will be noted that the posts 26 terminate at their upper ends slightly below the lower edge of the sides 16 of the housing so as to clear the housing when the table is revolved, and the lower ends 41 of posts 39 also are slightly spaced above the upper end of post 43 when the latter is in its lowered position. Thus the table 22 can be easily swung to its various positions.

The posts 26 of each set are arranged on three sides only of the paper 61, thus facilitating the removal of the top sheet of paper from the side of the plates 35 opposite the post 2, which is where the operator normally stands when operating the apparatus.

In hamburger stands, restaurants and other eating places, it is generally necessary to serve several different-sized hamburger steaks, whether in sandwiches or alone, there being, for example, a ten-cent size and a five-cent size, and certain patrons prefer odd-shaped steaks. Also, at the peak load of the day, it is highly desirable to keep a supply of several preformed patties in order to quickly fill the orders that come in two or more at a time, but it is very objectionable to maintain a large supply of ground hamburger meat in reserve since the meat quickly becomes grey, and in any event the majority of customers prefer to see the meat before it is ground in order to insure that they are getting meat of good quality.

In my apparatus, all the above advantages are found and in actual operation, if a large patty is desired, the operator quickly turns the table so that ring 27 is below the chopper, the required several chunks of meat are placed in the hopper 8, the lever 45 is pulled down, thus raising plate 35 the upper sheet of the stack 61 engages the ring 27, lifting it to engage with the lower edge of housing 13. The depressing of the outer end of lever 45 automatically starts the motor 3 and the ground chunks of meat are quickly formed to an absolutely perfect circular hamburger patty within the ring 27 on the upper sheet of the stack of papers. If there is a trifle overage of meat, the spring 42 permits the stack of paper to slightly yield downwardly.

The lever 45 is then raised, lowering the plate 35 with the patty on the stack, and the patty comes cleanly away from the ring 27 since the inner sides of the ring are slightly beveled outwardly as seen in Fig. 1. The motor automatically stops when the plate is lowered and the operator slides the top sheet of the stack, with the patty thereon, between the two side posts 26, and the patty is transferred to the stove without the meat having been touched by the hands of the operator as is the usual process in making patties.

If a smaller steak is desired, ring 28 is brought below the chopper, and the process is repeated, or by swinging ring 29 in place, a star-shaped steak is formed. All the rings may be made of the same size and thickness and shape, or they may be of different sizes and shapes and thicknesses, all that it is necessary to do to change the rings is to quickly slip the desired ring between any of the sets of posts desired after removing the ring previously between the posts. If a supply of several patties is desired, the operator can make up a plurality of patties according to the number of rings on the table, and while only three are shown, it is obvious that the table may extend all around the post 2.

The post 2 is made so as to telescopically join the pedestal and be separable therefrom by releasing the thumb-screw 62, thus not only disassembling the chopper from the pedestal but permitting the table to be disassembled for cleaning or repairing, or for substituting different-sized tables. Any possible binding of the table 22 is eliminated merely by providing the desired thickness bushing at 63 and access to the switch 58 and other parts within the pedestal is had through a removable plate 64 on the pedestal.

Having thus described my invention, what I claim is:

1. In apparatus for forming hamburger steak patties the combination comprising, a meat chopper including means for ejecting the chopped meat therefrom, a patty form having side walls and open top and bottom and positioned to receive the chopped meat ejected from the chopper through the open upper end thereof, means for closing the lower open end of the form and for supporting the chopped meat within the form, means adjacent the upper open end of the form operably connected to said chopper for distributing the chopped meat over the area within the form upon actuation of the chopper, and means mounting said form and supporting means for relative movement toward and away from each other whereby the chopped meat within the form will be supported on said supporting means free of the form.

2. In a construction as defined in claim 1, said supporting means including a horizontal table and said form being substantially annular in shape and disposed in a horizontal plane over said table and the chopper including a motor for actuating the same, and means actuated by the relative movement of the supporting means and form for causing actuation of said motor when the supporting means is in position to support the chopped meat within the form and for rendering the motor inoperative when the form and supporting means are moved apart from each other.

3. In apparatus for forming hamburger steak patties, the combination comprising a meat chopper having a downwardly directed discharge outlet for ejecting the chopped meat therefrom, a substantially annular horizontally disposed patty form below said discharge outlet positioned to receive the chopped meat therein, a horizontal plate below said annular form provided with a vertical pile of paper sheets positioned under the area within the form, and means mounting said chopper, form and plate for relative vertical movement toward and away from each other.

4. In apparatus for forming hamburger steak patties, a meat chopper having a downwardly directed outlet for ejecting the chopped meat therefrom, a horizontally disposed table below said chopper, a generally annular horizontally disposed patty form, means on said table supporting said form positioned to receive chopped meat from said outlet, means for moving said form vertically toward and away from said outlet, and means for moving said form horizontally from below said outlet.

5. In a construction as defined in claim 4, the means for moving said form vertically including a plate carried by said table below said outlet.

6. In apparatus for forming hamburger steak patties, the combination comprising a meat chopper having a downwardly directed outlet for ejecting the chopped meat therefrom, a plate below said outlet adapted to support a sheet of paper thereon for supporting the chopped meat on the paper, means for vertically moving said plate and chopper relatively, means for horizontally moving said plate and chopper relatively to each other a generally annular horizontally disposed patty form positioned adjacent said outlet in axial alignment therewith, and means for distributing chopped meat over the area within said form, said last-mentioned means being operatively connected with said chopper for actuation therewith.

7. In a construction as defined in claim 6, said last-mentioned means comprising a circular disk provided with a radially extending slot therein for passing the chopped meat therethrough to within the form.

8. In a construction as defined in claim 6, said patty form having its radially inwardly facing sides tapered outwardly in the direction toward the lower side of the form.

9. In apparatus for forming hamburger steak patties, the combination comprising a meat chopper having a downwardly directed outlet for the chopped meat, a horizontal plate below said outlet, a horizontally disposed generally annular form between said plate and outlet in axial alignment with the latter, said chopper including means for forcing said chopped meat into said form and toward said plate, and means positioned between said form and outlet for distributing meat over the area within said form.

10. In a construction as defined in claim 9, means yieldably supporting said plate and last-mentioned means in spaced relation.

11. In a construction as defined in claim 9, means yieldably supporting said plate and last-mentioned means in spaced relation comprising a spring below said plate whereby the plate will move downwardly upon a predetermined downward pressure thereon.

12. In apparatus for forming hamburger steak patties, a meat chopper having a downwardly directed discharge outlet for the chopped meat, a plurality of horizontal plates disposed in a generally horizontal plane below said outlet, means for selectively positioning one of said plates below said outlet, means disposed in a horizontal plane below said outlet and between the outlet and said selectively positioned plate for forming the chopped meat into patties, and means below said outlet and said selectively positioned plate for moving said plate toward and away from said outlet.

13. In apparatus for forming hamburger steak patties, a meat chopper having a downwardly directed discharge outlet for the chopped meat, a plurality of horizontal plates below said outlet and a plurality of generally annular horizontally disposed patty forms disposed in a substantially horizontal plane, one of said patty forms being disposed over each of said plates and spaced thereabove and the plane in which the forms are disposed being below said outlet, means for selectively positioning the plates and forms thereabove in axial alignment with said outlet, and means for moving the plate and form positioned below said outlet toward and away from said outlet when a corresponding plate and form are positioned below said outlet in axial alignment therewith.

14. In a construction as defined in claim 13, a vertical post stationarily supporting said chopper elevated above a supporting surface, and means for supporting said plates and forms from said post for revolving around the post in a circular path below said outlet.

15. In a construction as defined in claim 13 a base and vertically extending post arranged for supporting said chopper elevated above the base and the means for moving said plates and forms toward and away from said outlet including a vertically reciprocable rod mounted in said base, means connected to each of the plates adapted to engage said rod when one of the plates is axially aligned below the chopper for lifting the plate upon upward movement of the rod, and means projecting from a side of said base for manual operation for reciprocating said rod.

16. In a construction as defined in claim 13, pivotally mounted supporting means for said plates and forms for moving the plates and forms together in the planes of the plates and forms respectively to selectively position said plates and forms below said outlet, and vertical guide means carried by the supporting means for slidably supporting the forms respectively for vertical movement and for supporting said forms spaced above said plates, each of said plates being adapted to support a stack of papers, and said guide means being arranged to permit lateral sliding of said papers from said plates.

MARSHALL O. BESSONETTE.